Nov. 19, 1957     V. BALASS     2,813,603

BRAKE DEVICE FOR VEHICLES

Filed Feb. 26, 1954

INVENTOR
VALENTIN BALASS
BY Leon W. Straus

United States Patent Office 2,813,603
Patented Nov. 19, 1957

2,813,603
BRAKE DEVICE FOR VEHICLES

Valentin Balass, Zurich, Switzerland, assignor to Tecno Trade Anstalt, Mauren, Liechtenstein, a corporation of Liechtenstein Application February 26, 1954, Serial No. 412,907

Claims priority, application Switzerland August 4, 1953

14 Claims. (Cl. 192—1)

This invention relates to a brake device for vehicles having an hydraulic braking system, and more particularly to a brake device comprising a master cylinder connected to a brake operating member and wheel brake cylinders fed by said master cylinder with braking fluid for applying the wheel brakes of the vehicle when the brake operating member is operated.

It is an object of the present invention to provide means facilitating braking of an automobile, truck, trailer, and like vehicular structure under all conditions of operation in which such vehicular structure may be found, regardless of whether it be located on level ground or on a sloping surface.

It is another object of the present invention to provide means contributing to a highly efficient and substantially fool-proof brake device for use with automotive vehicles, which brake device combines the functions of both the foot brake and the conventional hand or parking brake in such a manner as to practically eliminate the possibility of failure of either the foot brake or the parking brake.

Another object of the present invention is to provide means contributing to a brake device of the aforesaid type in which the pressure applied to a suitable fluid is employed to provide the main braking forces both for stopping said vehicle while the latter is in motion and for retaining said vehicle in stopped or parked condition, a mechanical auxiliary linkage being provided in conjunction with the parking brake portion of said device to ensure operation of the latter even in case of failure of the fluid pressure system.

Still another object of the present invention is to provide means affording an improved and highly efficacious brake device for automotive vehicles, such as an automobile, which device is constructed and arranged to be jointly operated with the ignition system for the automobile so as to prevent release of the braking forces upon withdrawal of the ignition key from the ignition system.

Yet another object of the present invention is to provide means conducive to an improved brake device of the aforesaid type wherein the ignition system for the automobile and the control system for the brake device are so interrelated that when the ignition key is withdrawn in a first position of the control system, release of the braking forces in the absence of the key is rendered impossible, while when the key is withdrawn in another position of the control system, manual release and reapplication of said braking forces in the absence of the key is possible to permit shifting of the automobile without starting of the engine.

A further object of the present invention is the provision of means leading to a novel and greatly simplified brake device for automotive vehicles as above described, which device is safe in operation, may be automatically or semi-automatically controlled and substantially eliminates the problem of driver forgetfulness, thus tending to reduce accidents resulting from faulty brake operation both during stopping of the vehicles and during retention thereof in parked condition.

In order to enable the invention to be more readily understood, reference is made to the accompanying drawing which illustrates diagrammatically and by way of example, two embodiments thereof and in which.

Figure 1:
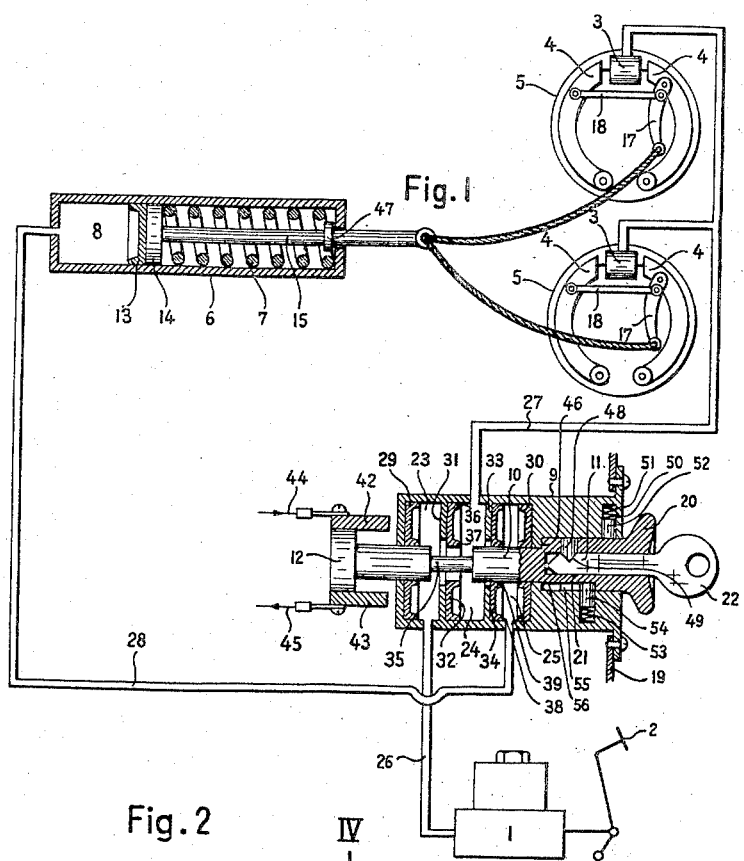
Figure 1 shows one embodiment of the brake device according to the present invention in the brake release position, only one of four vehicle wheels to be braked being shown in the drawing for the sake of simplicity.

The main parts of the brake device shown in Figure 1 comprise a master cylinder 1 with a brake pedal 2, a wheel brake cylinder 3 with two brake shoes 4 and a brake drum 5, an accumulator cylinder 6 with an energy storing member, such as a spring 7, and a pressure chamber 8, a control cylinder 9 with a control slide 10 and an ignition lock 11, and an ignition switch 12.

In the accumulator cylinder 6 the spring 7 presses against a piston 14 which is sealed by a packing cup 13 and which forms a movable closure wall of the pressure chamber 8.

The piston 14 is mechanically connected to the brake shoes 4 by means of a piston rod 15, a safety brake cable 16 which normally hangs loose, a lever 17, and a rod 18. Parts 17, 18, and their connection to the brake cable 16 can be identical with the arrangement normally used for automobile hand brakes.

The ignition lock 11 is incorporated in the control cylinder 9 and combined with the control slide 10. The control cylinder 9 is secured to the dashboard 19 of the vehicle at a point which is customary for the arrangement of the ignition lock of a vehicle. The control slide 10 has at one end and operating knob 20 by means of which the control slide 10 can be pushed by the driver of the vehicle into the control cylinder 9 (Figure 1) or pulled out of the cylinder (Figure 2), and a keyhole 21 for an ignition key 22 by which the driver of the vehicle can turn the control slide 10 and the ignition switch 12 connected thereto into a switched-on position A or a switched-off position O or into a second switched-off position B (Figure 3).

The control cylinder 9 has three chambers 23, 24, 25, located in a row and annularly surrounding the control slide 10. The chamber 23 is connected by a pipe 26 to the master cylinder 1, the chamber 24 by a pipe 27 to the wheel brake cylinders 3, and the chamber 25 by a pipe 28 to the pressure chamber 8 of the accumulator cylinder 6. The two outer chambers 23 and 25, and thus the control cylinder 9, are sealed towards the outside by sealing sleeves 29, 30. The chambers 23, 24 are separated from one another by a partition 31 with a sealing sleeve 32, and the chambers 24 and 25 are separated from one another by a partition 33 with a sealing sleeve 34.

Figure 2:
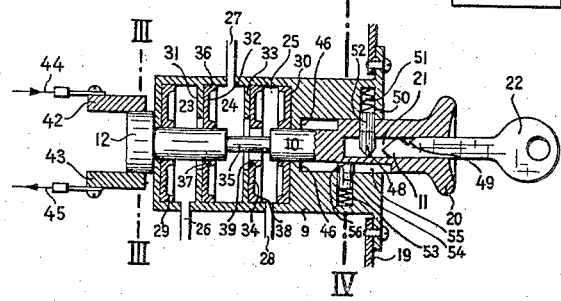
Figure 2 shows a part of the brake device of Fig. 1 in the braking position.
Figure 3:
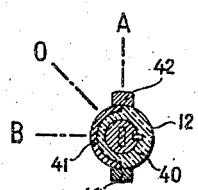
Figure 3 is a sectional view taken along the line III—III of Figure 2.
Figure 4:
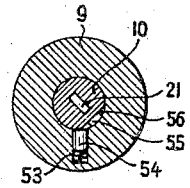
Figure 4 is a sectional view taken along the line IV—IV of Figure 2, with the control slide turned through 45°.

The control slide 10 has a recessed portion 35 which in the position shown in Figure 1 establishes a flow path for brake liquid between the chambers 23 and 24 and hence between the master cylinder 1 and the wheel brake cylinders 3, while in the position shown in Figure 2 said recessed portion establishes a flow path for brake liquid between the chambers 24 and 25 and hence between the pressure chamber 8 of the accumulator cylinder 6 and the wheel brake cylinders 3.

The sealing sleeve 32 has its sealing lips 36, 37 facing the chamber 24, and the sealing sleeve 34 has its sealing lips 38 and 39 facing the chamber 25, so that in the position of the control slide 10 shown in Figure 1 braking liquid can flow from the chamber 24 into the chamber 25 and in the poistion of the control slide 10 shown in Figure 2 braking liquid can flow out of the chamber 23 into the chamber 24, while a flow in the reverse direction is prevented by the sealing sleeves 32, 34. The sealing sleeves 32, 34 thus act as non-return valves.

As shown in Figure 3, the ignition switch 12 consists of a disc 40 of insulating material connected to the slide 10 and provided over half its periphery with a metal coating 41. The disc 40 is disposed between two contacts 42 and 43, which are connected by electric lines 44 and 45 to a battery and ignition coil (not shown), so that by the turning of the key 22 from the position O into the position A, the metal coating 41 makes an electrical connection between the two contacts 42, 43, and when the key 22 is turned into the position B, the lock 11 is controlled, while the ignition remains switched off.

The lock 11 is constructed in known manner, so that the slide 10 with the ignition switch 12 can be turned only with the aid of the key 22.

While the vehicle is travelling, the key 22 is in the position A for switched-on ignition and the control slide 10 is pushed fully in so that it engages a stop or shoulder 46, this being the brake release position shown in Figure 1. The control cylinder 9 then establishes a free flow path between the master cylinder 1 and the wheel brake cylinders 3 so that the driver of the vehicle can apply and release the hydraulic wheel brakes in the usual manner by stepping on the brake pedal 2.

In this position of the control slide 10, every time the brake pedal 2 is depressed, brake fluid flows from the master cylinder 1 into the wheel brake cylinder 3, and at the same time the pressure chamber 8 of the accumulator cylinder 6 is filled with brake fluid from the master cylinder 1, whilst simultaneously the spring 7 is compressed due to leakage of brake fluid past the sealing sleeve 34 until a stop ring 47 prevents further compression of the spring 7. The pressure chamber 8 can, however, also be filled in the other position of the slide 10 from the master cylinder 1, since the sealing sleeves 32 and 34 always permit the passage of brake liquid in this direction.

If the control slide 10 is pulled outwardly by the driver of the vehicle by means of the operating knob 20, the control slide 10 passes into the braking position illustrated in Figure 2 in which the disc 40 serves as a stop. In this position the control cylinder 9 connects the pressure chamber 8 to the wheel brake cylinders 3, so that the piston 14 displaces the brake liquid held by it under pressure out of the pressure chamber 8 into the wheel brake cylinders 3 and thus applies the brakes. By means of the operating knob 20 a hydraulic handbrake is thus operated by the driver of the vehicle, which when the vehicle is at rest, can be used as a parking brake and during travel can be used for example as an emergency brake, in which latter case the driver of the vehicle, in contradistinction to the usual automobile handbrake, can quickly release a large effective braking force with two fingers.

This hydraulic handbrake acts in the event of leakage in the hydraulic system as an automatic mechanical safety brake, since the safety cable 16 is so dimensioned that in all operative movements of the piston 14 it hangs loose but in the event of excessive displacement of the piston 14 in consequence of losses of braking liquid in the pressure chamber 8, the cable 16 is tightened due to expansion of the spring 7 which now mechanically applies the brakes.

In the brake release position of the slide 10 (Figure 1) the key 22 cannot be drawn out of the lock 11, because a pin 48 engages in a corresponding notch 49 in the key 22 and holds the latter fast in the lock 11. If, however, the slide 10 had been pushed into the braking position (Figure 2), the key 22 can be drawn out of the lock 11 because it can now push the pin 48 into a bore 50 in which is situated a pin 52 loaded by a spring 51. As soon as the key 22 is withdrawn, the spring 51 then pushes the pin 52 partly into the slide 10, so that the latter can no longer be turned or displaced. The pins 48 and 52 are thus main elements of a safety locking device.

By means of a second safety locking device, the ignition cannot be switched off when the slide 10 is in the brake release position (Figure 1), since in this position a pin 54 loaded by a spring 53 engages in a longitudinal groove 55 and renders impossible the turning of the slide 10. If however, the slide 10 has been drawn out into the braking position (Figure 2), the pin 54 comes out of the longitudinal groove 55 on to a cam-like surface 56 of the slide 10, which permits the turning of the slide because the pin 54 can now be pushed by the surface 56 into the wall of the cylinder 9.

This double safety locking device compels the driver of the vehicle to apply the hydraulic handbrake by pulling out the slide 10 before he removes the ignition key 22; and furthermore, until the key 22 has been turned into position B (Figure 3), this safety locking device renders it impossible to release the hydraulic handbrake after the key 22 has been drawn out.

The position B merely serves to permit the parking of the vehicle, for example in a garage, while the ignition is switched off. In this position B the key 22 can also be drawn out of the lock 11 if the slide 10 is in the brake release position, and it is also not possible to turn the ignition switch 12 from this position B into the ignition position A without a key 22, but in this position B the slide 10 can be pushed in and drawn out again even without the key 22, and thus the handbrake can be released and re-applied.

When the vehicle is stopped, it is advisable to pull out the slide 10 before the depressed brake pedal 2 is released, and it is also advisable when drawing out the slide 10, at the same time also to depress the brake pedal 2, in order that for the application of the hydraulic handbrake, brake liquid will not flow from the pressure chamber 8 but direct from the master cylinder 1 into the wheel brake cylinders 3 and therefore the piston 14 need not be moved.

Figure 5:
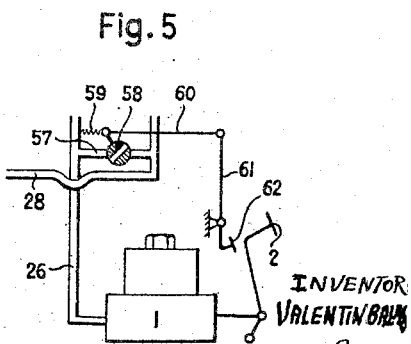
Figure 5 is a modified form of a part of the brake device shown in Figure 1.

In the embodiment illustrated in Figure 5, a connecting pipe 57 with a rotary slide valve 58 is incorporated in the brake device illustrated between the pipes 28 and 26, said rotary slide valve being held in the closed position by a spring 59 and brought into the opening position by a rod system 60, 61, operated by a member 62 disposed beneath the brake pedal 2.

When the brake pedal 2 is completely depressed for the purpose of braking the vehicle, it presses in turn, shortly before reaching the end position, on the operating member 62 and by means of the lever 61 and the rod 60 effects the opening of the rotary slide valve 58, so that communication is established between the pipes 28 and 26. Communication is thereby established between the pressure chamber 8 of the accumulator and the wheel brake cylinders 3 although the control slide 10 is in the brake release position (Figure 1). This enables an accumulator cylinder 6 adjusted to high pressure to be used for sensitive braking by means of the brake pedal 2, since on the depression of the brake pedal 2 the pressure in the pressure chamber 8 reacts through the piston of the master cylinder 1 on the foot of the driver of the vehicle, so that in the event of excessive pressure the driver will himself reduce the pressure applied by him to the brake pedal 2 and thus the slide valve 58 will close again. It is however still more important that in the event of the failure of the footbrake, the depression of the brake pedal 2 automatically brakes the vehicle through accumulator cylinder 6. It is moreover important that with the additional device illustrated in Figure 5, the necessary brake pressure is achieved at the very first depression of the brake pedal 2, even when the piston 14 of the accumulator cylinder 6 does not abut against the end wall of said cylinder.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In a braking device for a vehicle having a hydraulic braking system which includes a master cylinder operated by the brake pedal of said vehicle, brake cylinders for operating the brake shoes for the brakes of said vehicle, and first conduit means for establishing communication between said master cylinder and said brake cylinders; the improvement comprising an accumulator having a pressure chamber, second conduit means communicating with said pressure chamber, and a control device interconnecting said first and second conduit means to regulate flow of brake liquid between said master cylinder, said accumulator and said brake cylinders, said control device comprising a control cylinder provided with three flow chambers, said master cylinder communicating with the first of said flow chambers through a portion of said first conduit means, said brake cylinders communicating with the second flow chamber through another portion of said first conduit means, said pressure chamber communicating with the third flow chamber through said second conduit means, a control member slidably disposed in said control cylinder and operable, when in a first position, to established communication between said first and second flow chambers and thus between said master cylinder and said brake cylinders, and operable, when in a second position, to establish communication between said second and third flow chambers and thus between said brake cylinders and said pressure chamber of said accumulator, and an auxiliary mechanical connection between said accumulator and said brake shoes, whereby upon movement of said control member to said first position said vehicle may be driven and the brakes applied and released, respectively, by operation of said brake pedal, while upon movement of said control member to said second position said accumulator causes said brakes to be continuously applied to retain said vehicle in stopped or parked condition, said mechanical connection being constructed to actuate said brake shoes and apply said brakes only in the event of failure of said accumulator to do so.

2. In a braking device for a vehicle having a hydraulic braking system which includes a master cylinder operated by the brake pedal of said vehicle, brake cylinders for operating the brake shoes for the brakes of said vehicle, and first conduit means for establishing communication between said master cylinder and said brake cylinders; the improvement comprising an accumulator having a pressure chamber, second conduit means communicating with said pressure chamber, and a control device interconnecting said first and second conduit means to regulate flow of brake fluid between said master cylinder, said accumulator and said brake cylinders, said control device comprising a control cylinder provided with three openings, said master cylinder communicating with the first of said openings through a portion of said first conduit means, said brake cylinders communicating with the second opening through another portion of said first conduit means, said pressure chamber communicating with the third opening through said second conduit means, a control member movably disposed in said control cylinder and operable, when in a first position, to establish communication between said first and second openings and thus between said master cylinder and said brake cylinders, and operable, when in a second position, to establish communication between said second and third openings and thus between said brake cylinders and said pressure chamber of said accumulator, and an auxiliary mechanical connection between said accumulator and said brake shoes, whereby upon movement of said control member to said first position said vehicle may be driven and the brakes applied and released, respectively, by operation of said brake pedal, while upon movement of said control member to said second position said accumulator causes said brakes to be continuously applied to retain said vehicle in stopped or parked condition, said mechanical connection being constructed to actuate said brake shoes and apply said brakes only in the event of failure of said accumulator to do so.

3. In a braking device according to claim 2, further including means operatively connecting said control member to the ignition switch of said vehicle, said control member being provided with a keyhole for insertion of the ignition key for said vehicle, and safety lock means operatively connected with said control member and engageable with said key, whereby said key may be withdrawn from said keyhole only upon movement of said control member to said second position.

4. In a braking device according to claim 3, a locking device operatively connected with said control member to lock the control member in the second position when the key is withdrawn from said keyhole.

5. In a braking device according to claim 4, a further safety locking device operatively connected with said control member, said key being operable to permit turning of the control member into switched-off position only when said control member is in said second position.

6. In a braking device according to claim 4, in which the ignition switch is constructed to be turned into one ignition position and two switched-off positions, said locking device being operable to lock the control member in said second position only when the key is removed in one of said switched-off positions.

7. In a braking device according to claim 6, said control member being slidably supported by said control cylinder for reciprocal and rotary movement relative to said control cylinder and carrying an element of the ignition switch, whereby control of the flow of the brake fluid is effected by reciprocal movement of said control member to said first and second positions, respectively, and the switching on and off of the ignition is effected by rotary movement of said control member.

8. In a braking device according to claim 7, said control device being provided with three flow chambers, the first flow chamber communicating with said first opening and with said master cylinder, the second flow chamber communicating with said second opening and with said wheel brake cylinders, and the third flow chamber communicating with said third opening and with said pressure chamber of said accumulator, said control member extending through said flow chambers and being provided with a recessed portion by means of which said control member, when in said first position, connects said first flow chamber to the second flow chamber and, when in said second position, connects said second flow chamber to the third flow chamber.

9. In a braking device according to claim 8, further including sealing sleeves surrounding said control member within said control cylinder and operatively arranged at the junctures of said flow chambers to permit flow of said brake fluid from said first flow chamber to said second flow chamber, and from the latter to said third flow chamber while inhibiting such flow in the reverse direction, whereby, upon movement of said control member to said first position, said fluid can flow from said master cylinder to said pressure chamber of said accumulator but cannot flow back from said pressure chamber into said master cylinder, and, upon movement of said control member to said second position, said fluid can flow from said master cylinder into said brake cylinders but cannot flow back from the latter to said master cylinder.

10. In a braking device according to claim 9, said accumulator comprising a cylinder, a piston slidably disposed within said cylinder, a spring bearing against one face of said piston, the other face of said piston delimiting said pressure chamber, said sealing sleeves of said control cylinder constituting non-return valve means for fluid flowing from said master cylinder, whereby through the increasing of the amount of said brake fluid in said pressure chamber said spring is compressed and energy thereby stored.

11. In a braking device according to claim 2, further including additional conduit means for establishing an auxiliary flow path between said first and second conduit means, a valve member in said additional conduit means for opening and closing said auxiliary flow path, and an operating member for said valve member, said operating member being disposed adjacent said brake pedal so that on depression of the latter said valve member is operated by means of the operating member to said auxilary flow path.

12. In a braking device for vehicles having brake cylinders and brake shoes operated by brake fluid under pressure fed to said brake cylinders, the combination of a master cylinder for supplying said fluid under pressure to said brake cylinders for operating said brake shoes, an accumulator including an accumulator cylinder and a piston reciprocably disposed within said accumulator cylinder, said piston being constructed to be moved to a predetermined position by fluid under pressure fed to said accumulator cylinder from said master cylinder, and a control mechanism operable to selectively establish direct communication between said master cylinder and said brake cylinders and between said accumulator cylinder and said brake cylinders, with an auxiliary mechanical connection between said piston and said brake shoes, whereby upon leakage of brake fluid from said accumulator cylinder and movement of said piston from said predetermined position said brake shoes are automatically operated by said piston through said connection to retain said vehicle in braked condition.

13. In a braking device for vehicles having an ignition switch and a key therefor, brake cylinders and brake shoes operated by brake fluid under pressure fed to said brake cylinders, the combination of a master cylinder for supplying said fluid under pressure to said brake cylinders for operating said brake shoes, an accumulator including an accumulator cylinder and a piston reciprocably disposed within said accumulator cylinder, said piston being constructed to be moved to a predetermined position by fluid under pressure fed to said accumulator cylinder from said master cylinder, and a control mechanism connected with said switch and operable by manipulation of said key to open and close said ignition switch, respectively, and operable simultaneously to selectively establish direct communication between said master cylinder and said brake cylinders and between said accumulator cylinder and said brake cylinders, with an auxiliary mechanical connection between said piston and said brake shoes, whereby upon leakage of brake fluid from said accumulator cylinder and movement of said piston from said predetermined position said brake shoes are automatically operated by said piston through said connection to retain said vehicle in braked condition.

14. The combination according to claim 13, further including locking means operatively connected with said control mechanism.

References Cited in the file of this patent

UNITED STATES PATENTS

| | | |
|---|---|---|
| 2,217,141 | Sprenkle | Oct. 8, 1940 |
| 2,322,062 | Schnell | June 15, 1943 |
| 2,343,809 | Schnell | Mar. 7, 1944 |
| 2,347,847 | Schnell | May 2, 1944 |
| 2,427,669 | Gladden | Sept. 23, 1947 |
| 2,670,063 | Reynolds | Feb. 23, 1954 |